United States Patent Office 2,824,847
Patented Feb. 25, 1958

2,824,847

VINYL CHLORIDE POLYMER STABILIZED WITH THIOPHOSPHITE AND POLYVALENT METAL SOAP

Joseph Fath, Morristown, N. J., assignor, by mesne assignments, to Heyden Newport Chemical Corporation, a corporation of Delaware No Drawing. Application August 25, 1954
Serial No. 452,208

8 Claims. (Cl. 260—23)

This invention embodies novel polymeric vinyl resin compositions which are more resistant to deterioration under the influence of light and heat than those heretofore produced, as well as to additives adapted to be incorporated in vinyl resins generally, to impart to them the characteristics referred to.

The invention also includes processes for the manufacture of additives useful in the production of such resin compositions.

A rapidly expanding industry utilizing halogen containing resins, such as polyvinyl chloride, polyvinylidene chloride or copolymers thereof with vinyl acetate, vinyl stearate, styrene, acrylonitrile and other unsaturated monomers capable of polymerization, has created an important need for stabilizers to render the finished articles of manufacture therefrom more usable, more versatile in application and more permanent.

A number of such stabilizers have been employed. They have been used for two particular purposes. First, they are intended to prevent deterioration during processing which involves the fusion of the commonly used thermoplastic resin powder in the presence of a plasticizer at temperatures well above 250° F. Frequently, processing time extends over the period of one hour during which the composition, in the absence of stabilizers, turns amber or even black, making it unfit for further use. Second, stabilizers are intended to minimize deterioration of the finished article due to prolonged exposure to sunlight and/or heat.

The most common stabilizers for halogen containing resins are the metal soaps of a variety of fatty acids, such as, e. g., stearic, lauric, palmitic and 2-ethylhexoic acid. Among the most prominent of the metals used are cadmium, calcium, lead, zinc, strontium and dialkyl tin.

While the foregoing stabilizers have been used to a considerable extent in the art for the purposes stated, none of them actually solve the problem. Some have been used individually with different degrees of success while others are entirely ineffective when used separately and can produce measurable results only when used in combination with others. There has long been a need for more efficient stabilization of vinyl resin compositions of the character described, but no one heretofore has successfully supplied that need.

It is not the purpose of the present invention to eliminate the use of metal soap stabilizers, as heretofore employed in the art, but rather to provide additives which may be used in minor amounts in connection therewith, to very materially accentuate and increase the performance of the stabilizers for the production of more stable end products than have heretofore been obtainable through the use of stabilizers alone.

It may be stated in this connection that, while the additives of this invention have per se a stabilizing effect upon the polymers, the effect of their concurrent use with known stabilizers of the character described is more than a mere additive effect. On the contrary, the combination of the two, coacting in the vinyl resin composition, appears to produce a very definite synergistic action so that the stabilizing result from both is materially greater than the sum of the individual stabilizing actions of each.

As a result of prolonged experimentation and research, I have discovered and demonstrated that polymeric halogen containing vinyl resins of the prior art, stabilized with metal soaps as heretofore used and which were ineffective for satisfactory commercial usage, may be rendered highly effective for that purpose by the addition to such composition of certain compounds containing the =P—S— group.

These additive compounds are characterized by the fact that they contain a linkage of sulfur and trivalent phosphorous. Chemicals containing such a linkage are represented by the formula

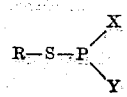

wherein R—S— is representative of the group consisting of thioalkyl, thioaryl, thioalkaryl and alkyl thioacylate and X and Y are representative of the group consisting of thioalkyl, thioaryl, thioalkaryl, alkyl thioacylate, alkoxy, aryloxy, alkaryloxy, arylaryloxy, etc. In this type of compound X and Y may be one and the same or they may be different members of the foregoing group of radicals. These compounds are generally known as trithiophosphites, dithiophosphites and monothiophosphites.

The foregoing formula may also be stated as follows:

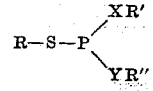

in which R is selected from the group consisting of alkyl, aryl, alkaryl, and carbalkoxy alkyl, R' and R" are selected from the group consisting of alkyl, aryl, alkaryl, and carbalkoxy alkyl, and X and Y are selected from the group consisting of sulphur and oxygen.

While it is recognized that other derivatives of trivalent phosphorus dissimilar to those described above have previously been employed in polyvinyl chloride compositions, I have demonstrated that the =P—S— linkage common to the compounds of this invention produces a stabilizing effect far in excess of an entirely out of proportion to the effect rendered by the compounds of the prior art.

Illustrative examples of the groups hereinbefore described are as follows:

Examples of R—S— are: methyl mercapto, ethyl mercapto, butyl mercapto, 2-ethyl-hexyl mercapto, tertiary dodecyl mercapto, tertiary octyl mercapto, tertiary amyl mercapto, lauryl mercapto, tetradecyl mercapto, phenyl mercapto, cresyl mercapto, amyl phenyl mercapto, benzyl mercapto (the same being examples of the thioalkyl, thioaryl, thioalkaryl groups), isooctyl thioglycolate, dibutyl thiomalate, cyclohexyl B-mercaptopropionate, etc. (the same being examples of alkyl thioacylates, namely, alkyl esters of carboxylic acids containing the thiol group).

Examples of X and Y are: methyl mercapto, butyl mercapto, 2-ethyl hexyl mercapto, lauryl mercapto, tertiary dodecyl mercapto, phenyl mercapto, cresyl mercapto, benzyl mercapto, p-tertiary butylphenyl mercapto, tridecyl thioglycolate, di-decyl thiomalate, furfuryl thioglycolate, 2-butyl octyl B-mercapto butyrate, methoxy, butoxy, 2-ethyl hexoxy, stearyloxy, tridecyloxy, epoxystearyloxy, phenylethoxy, benzyloxy, lauryloxy, cyclohexyloxy, terpinyloxy, cresoxy, p-tertiary amyl phenoxy, octylphenoxy, nonylphenoxy, p-tertbutylcresoxy, o-phenyl phenoxy, etc.

Examples of

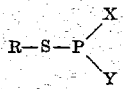

formed by the radicals enumerated above are:

Tri (decylthio) phosphite
Tri (laurylthio) phosphite
Tri (2-ethylhexylthio)phosphite
Tri (isooctyl thioglycolate) phosphite
Tri (benzylthio) phosphite
Dilaurylthio monobenzylthio phosphite
Di 2-ethyl-hexylthio monocresyl thio-phosphite
Mono diisobutylthio monophenylthio monobenzyl thio phosphite
Mono amyl phenoxy dilaurylthio phosphite
Mono tridecyloxy di-2-ethylhexylthio phosphite
Mono xylenoxy dibenzylthio phosphite
Mono hexoxy dicresylthio phosphite
Mono terpinyloxy didecylthio phosphite
Mono phenylethoxy di(cyclohexyl thioglycolate) phosphite
Mono furfuryloxy monolaurylthio mono (dihexyl thiomalate) phosphite
Mono butoxy di(2-butyloctyl B-mercapto butyrate) phosphite
Di amylphenoxy mono laurylthio phosphite
Di p-tertiary butyl phenoxy mono decylthio phosphite
Di benzyloxy mono benzylthio phosphite
Di decyloxy mono cresylthio phosphite
Mono phenoxy mono nonyl phenoxy mono phenylthio phosphite In order to demonstrate the efficacy of these compounds in polyvinyl chloride resin compositions, a number of vinyl films were prepared by milling, and the milled sheets were exposed to heat and light under varying conditions, but it will be understood that instead of milling the sheets as stated, they could have been extruded, molded or processed from a plastisol formulation or prepared in any other suitable manner common to commercial practice, for the tests to be carried out.

By way of specific example the following typical procedures were employed: From 0.1–2.0 parts of my additive were incorporated into a mixture consisting of 100 parts by weight of resin, 35–50 parts by weight of a plasticizer or mixture of plasticizers and 0.5–3.0 parts of a metal soap or mixture of metal soaps. The mixture was thoroughly blended until considered of uniform distribution and then milled for 5 minutes on a two-roll differential speed mill heated to 320–330° F. It was then removed as a milled sheet and permitted to cool. 1 x 1 inch squares were cut out of the sheet at sample locations and these squares were placed on a glass plate and kept in a mechanical convection oven at 350° F. Sample squares were removed at 15, 30, 45, 60 and 120 minute periods. They were rated visually according to the amount of discoloration incurred. A color rating scale was adopted for purposes of color comparison and, consequently, comparison of stabilizing efficiency. On a numerical scale from 1–9, a rating of 1 denoted no color, 3 denoted slight yellowing, 5 denoted yellowing, 7 denoted amber and 9 denoted non-transparent black. A summary of specific examples is given in Table I.

TABLE I

| Composition No. | Stabilizer | Pts | Resin [1] | Pts | Plasticizer [2] | Pts | Color Rating at— | | | | |
|---|---|---|---|---|---|---|---|---|---|---|---|
| | | | | | | | 15 min. | 30 min. | 45 min. | 60 min. | 120 min. |
| I | Tri (decylthio) phosphite | 0.5 | Geon 101 E P (Goodrich) | 100 | Dioctyl Phthalate | 50 | 1 | 1 | 1.5 | 2 | 2 |
| | Barium-Cadmium Laurate | 2.0 | | | | | | | | | |
| II | Tri (cresylthio) phosphite | 1.0 | VYNW (Bakelite) | 100 | Dioctyl Phthalate | 45 | 1 | 1.5 | 2 | 2.5 | 3 |
| | Cadmium Octoate | 1.0 | | | G-62 (Rohm & Haas) | 5 | | | | | |
| III | Monoamylphenoxy di(isooctyl thio glycolate) phosphite | 3.0 | Geon 101 E P | 100 | Dioctyl Phthalate | 22 | 1 | 1 | 2 | 3 | 4 |
| | | | | | G-62 | 5 | | | | | |
| | | | | | TCP | 8 | | | | | |
| | Barium Cadmium Stearate | 1.0 | | | 4 GO (Carbide & Carbon) | 8 | | | | | |
| IV | Monostearyloxy monobenzylthio monolaurylthio phosphite | 5.0 | Opalon 300 (Monsanto) | 100 | Dioctyl Phthalate | 25 | 1 | 2 | 2 | 2 | 3 |
| | | | | | Dioctyl Sebacate | 25 | | | | | |
| | Cadmium Epoxystearate | 0.5 | | | | | | | | | |
| V | Monotridecyloxy monononylphenoxy monolauryl thio phosphite | 0.1 | VYNW | 100 | Dioctyl Phthalate | 50 | 1 | 2 | 3 | 4 | 4 |
| | Calcium-Zinc Stearate | 3.0 | | | | | | | | | |
| VI | Dixylyl monotriisobutyl thio phosphite | 2 | Marvinol VR-20 (Naugatuck) | 100 | Dioctyl Phthalate | 50 | 1 | 2 | 2 | 2 | 3 |
| | Cadmium-Barium Decanoate | 1 | | | | | | | | | |
| VII | Di 2-ethylhexyloxy mono-2-ethylhexylthio phosphite | 2 | Geon 101 E P | 100 | Dioctyl Phthalate | 45 | 1 | 2 | 2 | 2.5 | 4 |
| | Barium-Zinc Palmitate | 2 | | | G-62 | 5 | | | | | |
| VIII | None | | Geon 101 E P | 100 | Dioctyl Phthalate | 50 | 9 | 9 | 9 | 9 | 9 |

[1] The trade names herein referred to represent polyvinyl chloride resins and modified polyvinyl chloride resins produced by the manufacturers above enumerated.
[2] G-62, an epoxy type polymeric plasticizer. TCP, tricresyl phosphate. 4 GO, tetra ethylene glycol di-2-ethylhexoate.

Di phenoxy mono (hexyl thioglycolate) phosphite
Di butoxy mono laurylthio phosphite
Di furfuryloxy mono 2-ethyl-hexylthio phosphite
Mono terpinyloxy mono xylenoxy mono diisobutylthio phosphite
Mono epoxystearyloxy mono octylphenoxy mono benzylthio phosphite
Mono decyloxy mono furfuryloxy mono decylthio phosphite
Mono butoxy mono phenoxy mono cresylthio phosphite
Mono phenyl phenoxy mono benzyloxy mono (isooctyl thioglycolate) phosphite
Mono butoxy mono lauryloxy mono laurylthio phosphite Table I clearly demonstrates the high degree of effectiveness obtained in this novel use of the additive compounds heretofore described, especially when compared to compositions in which no stabilizers were employed. The excellent color ratings shown in Table I demonstrate that the use of compounds of the structure

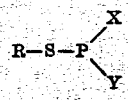

greatly enhances the influence of the metallic soaps in the total composition.

In order to indicate the efficacy of the additive compounds of the present invention as light stabilizers, films of 15 mils thickness were prepared by the above procedure. Sample strips of these films were exposed to ultra-violet light in an Atlas Electric Devices Company FDA-R Color Fadeometer and were rated visually from day to day until failure had occurred. Failure was considered as the time elapsed to obtain a color rating of 5 as defined by the scale enumerated above. The following table is indicative of the results thus obtained.

TABLE II

| Composition No. (as per Table I) | Number of Hours to Reach Color Rating of 5 |
|---|---|
| I | 700 |
| II | 1,200 |
| III | 800 |
| IV | 650 |
| V | 600 |
| VI | 800 |
| VII | 1,100 |
| VIII | 100 |
| Same as VI, but Cadmium-Barium compound only | 300 |

In the preparation of the additive compounds of the present invention, certain novel improvements have been made which render the commercial production of these materials possible at lower cost, with better yields, faster and simpler processing, and with less elaborate equipment.

My additive compounds are prepared by the reaction of one mol of phosphorus trichloride, one mol of a mercaptan and two mols of a compound designated as X—H and Y—H, wherein H is a hydrogen atom and X and Y have hereinbefore been described, in an anhydrous hydrocarbon solvent. This reaction should be carried out in the presence of a hydrogen chloride acceptor in order to permit completion of reaction and the formation of the desired end product. Chemically, the reaction may be represented as follows:

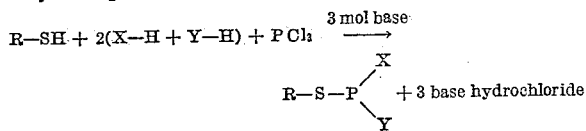

If prepared in the presence of a sufficient quantity of hydrogen chloride acceptor to remove all of the hydrogen chloride liberated from the reaction mixture, the formation of undesirable and extraneous side products is avoided and the main product is formed with an excellent yield. The reaction is carried out in anhydrous medium in order to prevent hydolysis of the resultant phosphorus-sulfur compound. For this reason the base hydrochloride formed cannot be washed out of the reaction despite its excellent water solubility and must be removed as the anhydrous salt by filtration.

Common organic bases used in this reaction have been tertiary nitrogen containing compounds such as pyridine, dimethyl aniline, diethylaniline, etc. While the filtration of small amounts of pyridine hydrochloride, etc., from laboratory batches presents no particular difficulty, its use in commercial manufacture is not practical because of high cost, a high order of hygroscopicity causing caking and plugging of the filter, solubility in hydrocarbons causing incomplete removal of the salt with consequent incomplete reaction and contamination of the end product.

One novel feature incorporated in this procedure is demonstrated by the use of dimethylaniline as an acceptor for hydrogen chloride. I have found that if the reaction slurry, following the formation of dimethyl aniline hydrochloride crystals, is heated to about 80° C., the hydrochloride salt melts into a liquid insoluble in the hydrocarbon reaction medium. As such, it is permitted to settle to the bottom of the reaction vessel from whence it may either be drawn off or where it may be permitted to fuse into a solid cake. Under the latter procedure the hydrocarbon reaction medium is conveniently decanted and contains no unreacted or dissolved acceptor or acceptor salt.

In either case, the hydrocarbon solvent medium is stripped, removing the solvent from the desired product which is free of contaminants, in practically quantitative yield, and may be used directly without further processing. The hydrochloride salt is dissolved in water, made basic with excess sodium hydroxide and the recovered base, e. g., dimethyl aniline, extracted with the solvent previously stripped off. On azeotropic refluxing this solvent-base solution is ready for a subsequent run. Neither base nor solvent are expended in this way and therefore do not materially contribute to the raw material cost of the phosphorus-sulfur compound.

By this greatly simplified procedure the net hydrogen chloride acceptor becomes sodium hydroxide which is readily expendable. Dimethyl aniline is a preferred embodiment of this aspect of the present invention because of its relative low cost and lack of water solubility on recovery, although other bases such as diethyl aniline, tributylamine, etc. may be used equally well in this procedure. A great number of compounds of the general formula

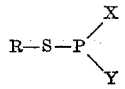

have been prepared in this manner generally, varying widely hydrocargon solvents, compounds represented by R—SH, X—H and Y—H and hydrogen chloride acceptors.

The following examples serve to illustrate briefly the simplicity of this process but are not considered to impose narrow limitations on conditions of preparation.

*Example I*

Into a one liter 3-neck flask equipped with agitator, thermometer, reflux condenser with calcium chloride tube, and dropping funnel, were introduced 174 grams n-decyl mercaptan (1 mol), 200 cc. toluene and 121 grams dimethyl aniline (1 mol). While agitating vigorously and cooling the flask with an ice bath, there was added dropwise over a period of three quarters of an hour, 45.8 grams phosphorus trichloride (0.33 mol). The reaction was cooled at such rate as to maintain the temperature between 20–25° C. At the end of addition, agitation was continued for one hour, after which the precipitation of dimethyl aniline hydrochloride was considered to be complete. The temperature was raised to 80° C. and agitation discontinued to permit settling of fused hydrochloride salt. When separation was complete, the upper layer was removed from the flask by suction and transferred to a still where the benzene was removed and collected by stripping in a vacuum of 50 mm. up to 110° C. The residue consisted of tri (decyl thio) phosphite.

Percent S found _____ 17.2
Percent P found _____ 5.8
Percent S calc. _____ 17.45
Percent P calc. _____ 5.64

To the dimethyl aniline hydrochloride in the reaction flask was added 300 cc. water and the benzene which had been recovered by vacuum stripping. 100 grams of a 50% solution of sodium hydroxide were added slowly while agitating and cooling to maintain temperature below the boiling point of benzene. The mixture was transferred to a separatory funnel, the aqueous layer removed and the benzene layer washed with three 100 cc. portions of water. On separation, it was returned to the flask and refluxed azeotropically, by introducing a Dean-Stark tube, until dry. To this solution may be added decyl mercaptan for a subsequent batch.

Example II

Into a 1 liter 3-neck flask equipped with agitator, thermometer dropping funnel and reflux condenser fitted with a calcium chloride tube, were introduced 82.6 grams benzyl mercaptan (0.67 mol), 200 cc. cyclohexane, 54.7 grams paratertiary amyl phenol (0.33 mol) and 149 grams diethylaniline (1.0 mol). Agitation was begun and when complete solution had been obtained, 45.8 grams phosphorus trichloride (0.33 mol) were added dropwise over a period of three quarter of an hour. The temperature was maintained at 20–25° C. by external cooling. Agitation was continued for one hour following the end of addition. The slurry was then heated, liquifying at about 80° C. Stirring was discontinued and the contents of the flask were permitted to cool. When the temperature of the contents had reached 25° C., complete separation of the layers had occurred and the lower layer had fused into a solid mass. The upper cyclohexane layer was decanted, stripped in vacuum and yielded a residue consisting of paratertiary amyl phenoxy di (benzylthio) phosphite. 300 cc. water were added to the solid cake of hydrochloride salt and a solution was obtained by slight heating. The cyclohexane previously stripped off was added to this solution, 100 grams of 50% sodium hydroxide solution were added and the cyclohexane layer was separated and washed three times with water. It was returned to the flask and refluxed with a Dean-Stark tube to remove water azeotropically. It was then used for a subsequent batch by adding benzyl mercaptan and paratertiary amyl phenol in the above quantities.

Example III

Into a 5 liter 3-neck flask equipped with agitator, thermometer, dropping funnel, reflux condenser and calcium chloride tube, were introduced 202 grams lauryl mercaptan (1 mol), 328 grams paratertiary amyl phenol (2 mols), 600 grams benzene and 363 grams dimethyl aniline (3 mols). The mixture was agitated until uniform and then there were added 137.5 grams phosphorus trichloride (1 mol) at such a rate as to maintain the temperature at 25° C., with external water cooling. Upon completion, the slurry was stirred for an additional hour and it was then heated to 72° C., transferred to a separatory funnel and the two liquid layers were permitted to separate. The lower layer was removed while still liquid by running it into a beaker containing 1000 cc. water. The upper layer was stripped in vacuum, yielding a residue consisting of di amyl phenoxy mono lauryl thiophosphite. The benzene distillate was added to the beaker containing dimethylaniline hydrochloride solution, 300 grams of 50% solution of sodium hydroxide were added with agitation followed by separation of the aqueous from the organic layer. The organic layer was washed three times with water and dried by azeotropic refluxing. The dry solution was used for a subsequent run, adding the above expended reagents.

The compounds hereinbefore described are valuable additives not only in polymeric resin compositions but also in other halogenated materials, which include metal soap stabilizers. They are also useful as rubber anti-oxidants, and in lube oil additives and many other articles of commerce in need of stabilization against deleterious effects of light and heat.

The foregoing detailed description sets forth the invention in its preferred practical forms, but the invention is to be understood as fully commensurate with the appended claims.

Having thus fully described the invention, what I claim as new and desire to secure by Letters Patent is:

1. A resinous polymer of vinyl chloride, stabilized against the deteriorating effects of light and heat by a stabilizing amount of an admixture of at least one soap of a polyvalent metal and an additive represented by the formula

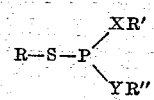

in which R is selected from the group consisting of alkyl, aryl, alkaryl, and carbalkoxy alkyl, R' and R" are selected from the group consisting of alkyl, aryl, alkaryl, and carbalkoxy alkyl, and X and Y are selected from the group consisting of sulphur and oxygen.

2. A composition according to claim 1, wherein the resinous polymer is a homopolymer of vinyl chloride.

3. A composition according to claim 1, comprising a plurality of different metal soap stabilizers.

4. A compositon according to claim 1, wherein the composition includes .01–5.0% by weight of additive per 100 parts of the resin.

5. A composition according to claim 1, wherein the additive is tri (decylthio) phosphite.

6. A composition according to claim 1, wherein the additive is mono tridecyloxy di-2-ethylhexylthio phosphite.

7. A composition according to claim 1, wherein the additive is di amylphenoxy mono laurylthio phosphite.

8. A composition according to claim 1, wherein the additive is mono butyoxy mono lauryloxy mono laurylthio phosphite.

References Cited in the file of this patent

UNITED STATES PATENTS

| | | |
|---|---|---|
| 2,226,552 | Conary et al. | Dec. 31, 1940 |
| 2,227,985 | Swan | Jan. 7, 1941 |
| 2,403,792 | Engelke | July 9, 1946 |
| 2,456,216 | Richter | Dec. 14, 1948 |
| 2,493,390 | Chaban | Jan. 3, 1950 |
| 2,564,646 | Leistner et al. | Aug. 14, 1951 |
| 2,572,571 | Marling | Oct. 23, 1951 |
| 2,587,616 | Harman | Mar. 4, 1952 |
| 2,616,925 | Asseff et al. | Nov. 4, 1952 |
| 2,735,832 | Wicklatz et al. | Feb. 21, 1956 |